(12) United States Patent
Booth et al.

(10) Patent No.: US 6,912,441 B2
(45) Date of Patent: Jun. 28, 2005

(54) RULE-BASED METHOD FOR PACKAGING SPOOLS OF FIBER

(75) Inventors: Kevin Dale Booth, Sumter, SC (US); John Arthur Prytulka, Kingston (CA); Richard Wayne Watson, Lugoff, SC (US); Thomas Wilson Oakley, Hockessin, DE (US)

(73) Assignee: Invista North America S.a.r.l., Wilmington, DE (US)

( * ) Notice: Subject to any disclaimer, the term of this patent is extended or adjusted under 35 U.S.C. 154(b) by 0 days.

(21) Appl. No.: 10/380,084

(22) PCT Filed: Sep. 25, 2001

(86) PCT No.: PCT/US01/29929

§ 371 (c)(1),
(2), (4) Date: Mar. 10, 2003

(87) PCT Pub. No.: WO02/26610

PCT Pub. Date: Apr. 4, 2002

(65) Prior Publication Data

US 2004/0128015 A1 Jul. 1, 2004

Related U.S. Application Data

(60) Provisional application No. 60/236,759, filed on Sep. 29, 2000.

(51) Int. Cl.[7] .............................................. G06F 19/00
(52) U.S. Cl. ...................... 700/136; 700/95; 700/115; 700/130; 242/118
(58) Field of Search ..................... 700/90, 95, 114, 700/115, 126, 130, 144; 53/118; 242/118

(56) References Cited

U.S. PATENT DOCUMENTS

| 4,351,494 A | 9/1982 | Schippers et al. | |
|---|---|---|---|
| 4,828,191 A | 5/1989 | Riige et al. | |
| 4,843,808 A | 7/1989 | Riige et al. | |
| 5,063,507 A | 11/1991 | Lindsey et al. | |
| 5,381,340 A * | 1/1995 | Ueda et al. | 700/130 |
| 5,402,355 A | 3/1995 | Bahlmann et al. | |
| 5,836,532 A | 11/1998 | Thompson | |
| 5,844,494 A | 12/1998 | Spahlinger et al. | |
| 6,021,942 A * | 2/2000 | Monico | 235/375 |
| 6,110,403 A | 8/2000 | Binner et al. | |
| 6,129,796 A * | 10/2000 | Steinberg et al. | 156/64 |

FOREIGN PATENT DOCUMENTS

| EP | 0 452 810 | 10/1991 |
|---|---|---|
| EP | 0 854 107 | 7/1998 |
| WO | WO 94/20230 | 9/1994 |

* cited by examiner

Primary Examiner—Jayprakash N. Gandhi (57) ABSTRACT

A rule-based method for packing a customer delivery unit containing a predetermined plurality of spools of filamentary product thereon comprises the steps of: (a) uniquely identifying each of a plurality of spools; (b) recording for each spool information regarding the kind of product on the spool, the grade of the product on the spool, and the weight of the product on the spool; (c) based on the product kind, grade, and weight information, assigning to each spool an appropriate one of a plurality of packing rules; and (d) selecting a predetermined plurality of tubes for inclusion in a customer delivery unit in accordance with the packing rule assigned to each selected tube. In another aspect the invention is directed to a method for manufacturing spools of a filamentary product in which information regarding predetermined process conditions in existence during the manufacture of the filamentary product are monitored and stored in a database, the improvement comprising: (a) storing in a database information regarding predetermined properties of the fiber on each spool, and (b) for at least one of the spools, correlating the manufacturing process information and the fiber property information.

2 Claims, 6 Drawing Sheets

| Merge (70-1) | Grade (70-2) | Tube Size High (70-3) | Tube Size Low (70-4) | Amount Undersize (70-5) | Number Undersize (70-6) | Tube Type (70-7) | Merge Same (70-8) | Spin Machine Same? (70-9) | |
|---|---|---|---|---|---|---|---|---|---|
| 101 | High | 15 | 19.9 | 0 | 0 | PY | Y | Y | 72-1 |
| 101 | High | 12.5 | 14.9 | 0 | 0 | PY | Y | Y | 72-2 |
| 101 | Medium | 15 | 19.9 | 0 | 0 | PY | Y | N | 72-3 |
| 101 | Medium | 12.5 | 14.9 | 0 | 0 | PY | Y | N | 72-4 |
| 101 | Low | 15 | 25 | 0 | 0 | PY | N | N | 72-5 |
| 101 | Low | 0.5 | 14.9 | 0 | 0 | PY | N | N | 72-6 |

| Product Run Same? (70-10) | Age (a) (70-11) | Age Span (days) (70-12) | CDU Config (70-13) | Spools/CDU (70-14) | Even Odd Position (70-15) | Number Empty Spacers (70-16) | |
|---|---|---|---|---|---|---|---|
| Y | 3 | 1 | 360 | 36 | Y | 0 | 72-1 |
| Y | 3 | 1 | 340 | 48 | Y | 0 | 72-2 |
| N | 3<a<5 | 4 | 360 | 36 | Y | 1 | 72-3 |
| N | 3<a<5 | 4 | 340 | 48 | Y | 1 | 72-4 |
| N | Any | Any | 360 | 36 | Y | 1 | 72-5 |
| N | Any | Any | 340 | 48 | Y | 1 | 72-6 |

RULE-BASED METHOD FOR PACKAGING SPOOLS OF FIBER

This application claims benefit of 60/236,759 filed Sep. 29, 2000.

BACKGROUND OF THE INVENTION

1. Field of the Invention

The invention relates a rule-based system for selecting finished spools of fiber for inclusion in a customer delivery unit.

2. Description of the Prior Art

Synthetic filamentary product, such as nylon fiber, is produced by extruding a molten polymer material through a multi-orifice spinneret plate housed in the spin pack of a spinning machine and then winding the fiber onto a spool. Various process conditions of the polymer and the spinning machine are monitored and controlled in an attempt to insure that the fiber produced meets acceptable product standards.

Heretofore, no systematic effort is expended to track the production history of a given spool of product as that spool moves along the manufacturing floor. Therefore, whenever a spool of unacceptable product has been produced, it is often difficult to ascertain exactly what process variable is responsible for the product unacceptability. Also, there is no available system to insure that plural spools of product shipped to a given customer have undergone similar processing and have similar product qualities.

In view of the foregoing, it is believed advantageous to provide a monitoring system whereby information concerning the properties exhibited by the fiber on each finished spool may be gathered and recorded. It is also believed advantageous to be able to use information regarding the kind and quality of product on any given spool to select differentially spools of fiber for inclusion in a given shipment to a customer.

SUMMARY OF THE INVENTION

The invention relates to a rule-based method for packing a customer delivery unit containing a predetermined plurality of spools, each having a filamentary product thereon. The method comprises the steps of:

(a) uniquely identifying each of a plurality of spools;

(b) recording for each spool information regarding the kind of product on the spool, the grade of the product on the spool, and the weight of the product on the spool;

(c) based on the product kind, grade, and weight information, assigning to each spool an appropriate one of a plurality of packing rules; and (d) selecting a predetermined plurality of tubes for inclusion in a customer delivery unit in accordance with the packing rule assigned to each selected tube.

In another aspect the invention is directed to a method for manufacturing spools of a filamentary product in which information regarding predetermined process conditions in existence during the manufacture of the filamentary product are monitored and stored in a database, the improvement comprising:

(a) storing in a database information regarding predetermined properties of the fiber on each spool, and (b) for at least one of the spools, correlating the manufacturing is process information and the fiber property information.

BRIEF DESCRIPTION OF THE DRAWINGS

The invention will be more fully understood from the following detailed description, taken in connection with the accompanying drawings which form a part of this application, and in which:

FIG. 2A illustrates a typical identifier tag used to identify a finished spool of filamentary product, while

DETAILED DESCRIPTION OF THE INVENTION

Throughout the following detailed description similar reference numerals refer to similar elements in all figures of the drawings.

Figure 1:
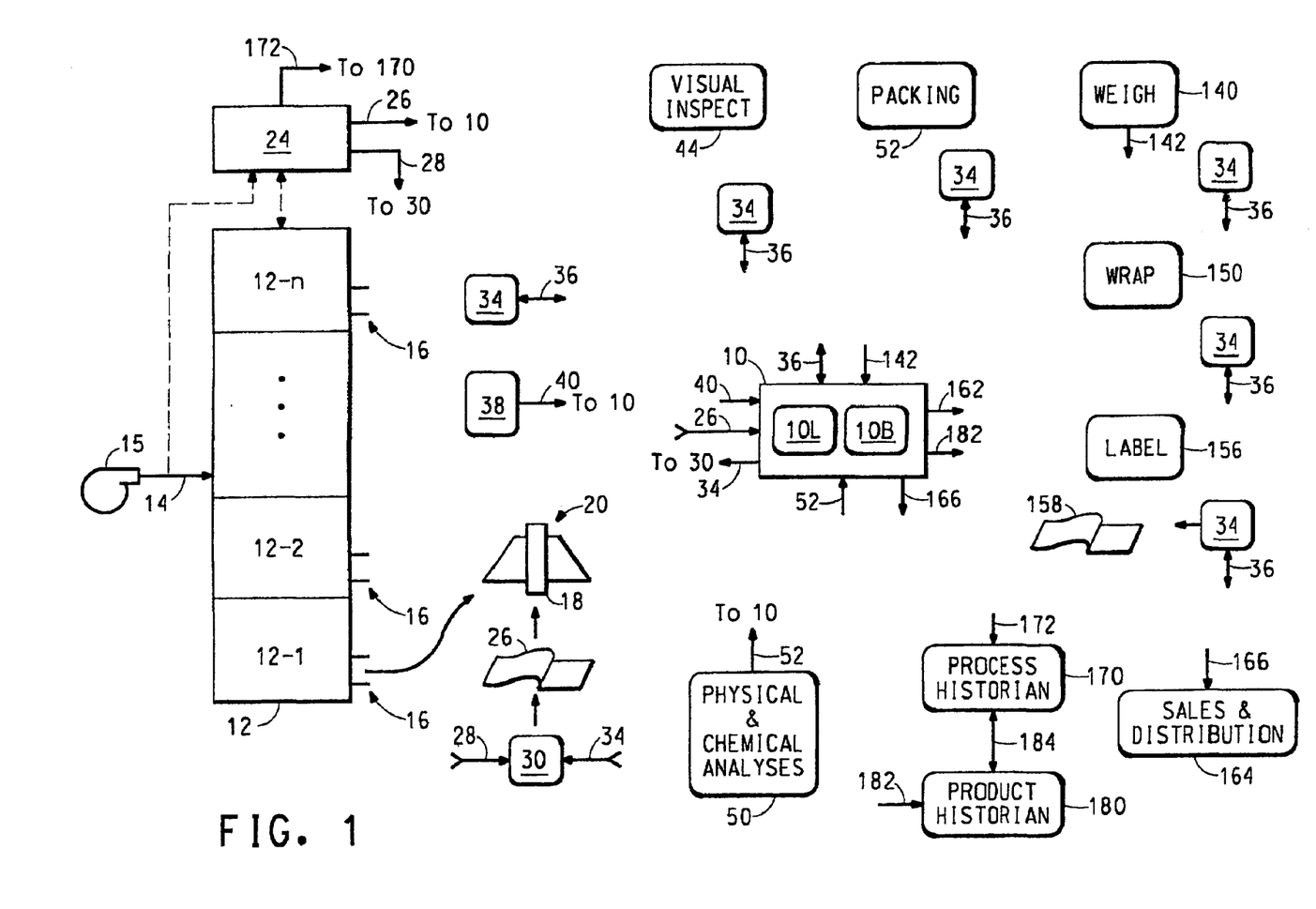
FIG. 1 is a schematic representation of the manufacturing floor of a plant for producing a filamentary product, such as nylon fiber, from which an understanding of the process of the invention maybe obtained.

FIG. 1 is a stylized schematic representation of the physical layout of the floor of a facility for manufacturing and shipping a filamentary product, such as nylon fiber, from which an understanding of the operation of the Tracking And Grading System ("TAG System") of the present invention may be gained. The TAG System here described, generally indicated by the reference character 10, provides a system whereby each spool of nylon fiber is completely traceable throughout the manufacturing process and whereby finished spools may be grouped into "customer delivery units" (as defined herein) in accordance with various predetermined packing rules. The packing rules are configurable in the sense that they may be varied from site to site in accordance with local requirements.

In the preferred instance the TAG System 10 is a computer-implemented system that includes a database 10B and a logic unit 10L. The TAG System 10 operates to track each spool of nylon fiber as the same moves through a manufacturing facility, from production to warehouse/storage or delivery.

The TAG System 10 may be implemented on any computing platform, such as one based upon any suitable processor sold by Intel Corporation, Santa Clara, Calif., running under Windows® NT® operating system available from Microsoft Corporation, Redmond, Wash. Suitable for use as the database engine is Microsoft SQL Server, also available from Microsoft Corporation. The functional requirements for the code for the logic portion 10L of the TAG System is discernible from the following description. The code is preferably written in Microsoft C++ and Visual Basic languages.

As will be developed the database 10B of the TAG System 10 stores information regarding each manufactured spool of nylon received from information sources located throughout the manufacturing floor. Based upon the information stored in the database 10B and/or received from the information sources located throughout the floor of the manufacturing facility, the logic unit 10L decides which of the plurality of packing rules is applicable to a particular spool and whether the properties of a given spool conform to a particular packing rule. Generally speaking, the particular packing rule to be employed in a given situation is selected from a rules table in accordance with the "kind" of product produced (termed "merge"), the quality ("grade") of the product produced, and the weight of the product carried on a given spool. The logic unit 10L also serves to determine whether a given spool conforms to its applicable packing rule to merit inclusion in a particular customer delivery unit.

It should be apparent that although the TAG system 10 is described in terms of packing spools of nylon fiber, its principles may be readily extended to the packing spools of other filamentary materials, or even more broadly, to the packing of various manufactured products.

A facility for manufacturing a filamentary product, such as a nylon fiber, typically includes several fiber spinning machines, one of which is generally indicated in FIG. 1 by the reference character 12. Molten polymer is pumped by a meter pump 15 to each spinning machine 12 through a transfer line 14.

Each spinning machine 12 may include a plurality of spinning positions 12-1 through 12-N. Each spinning position produces a plurality of fiber filaments. Groups of filaments are gathered (either manually or automatically) to define one or more threadlines of fiber. Typically, there are from two to eight threadlines of fiber produced at each spinning position. One or more of the threadlines produced at a given spinning position is (are) gathered by an operator or automatically strung-up to is form one threadline yarn on each core 18.

A wind-up mechanism 16 is provided at each spinning position. The wind-up mechanism 16 includes a plurality (on the order of two to eight) spindles, each of which is operative to wind a yarn produced at the spinning position onto a core 18. The core 18 is typically a hollow cardboard cylinder, although it may be formed of other material, such as plastic. The core 18, when carrying a length of fiber, is termed a finished "spool", although the terms "bobbin" or "tube" are also employed in the art. The finished spool is indicated by the reference character 20.

Prior to the start of production the intended properties of a fiber to be produced by a given machine are defined and stored in the database 10B of the TAG System 10. These intended (or "target") product properties, termed "product merge" or simply "merge", collectively define the "kind" of product to be produced on the machine during production. Properties included within a given fiber "merge" include the "recipe" ("type") of the polymer in the transfer line 14, and the fiber denier, luster and filament count.

Each spinning machine 12 is controlled and its operating conditions monitored by a real-time controller 24. During operation of the spinning machine 12 information is provided from the controller 24 to the TAG System 10 over a link 26. The information provided to the TAG system 10 includes both "machine level" and "position level" information.

"Machine level" information includes the beginning and end times for the period during which fiber is being continuously produced on a given machine 12 (termed a "production run"), the conditions of the polymer being supplied to the machine 12 throughout each production run, as well as various machine set-points.

In the database 10B all spools of fiber produced on a given machine (regardless of position) share the same production run identifier. Moreover, each spool 18 produced on given machine during a given production run also shares the same "merge" identifier in the database 10B.

In general, any or all of the process conditions may be reported to the TAG System 10 from the controller 24 during each production run. Included among the various conditions reported are, for example, polymer temperature and polymer viscosity, and meter pump speed. Information transmitted to TAG System 10 is used by the logic unit 10L to derive an indication of the grade of the fiber on each spool of fiber produced during a production run. Based upon the reports of conditions monitored by the controller 14 the logic unit 10L is able to derive an indication of the "grade" of the fiber being produced. "Grade" is a measure of the quality of the fiber produced and measures the degree to which the intended product "merge" has been achieved. The grade of fiber produced by a given machine may change over the course of a production run. As will be developed, various sources of product grade information are available to TAG System 10.

In one practical implementation the controller 24 may be arranged to provide to the TAG System 10 with only those process conditions which are "out-of-limit", that is, which fall outside predetermined operational levels. The out-of-limit conditions are captured by the TAG System 10 to relay a clear understanding as to why the grade of the spools being doffed at a particular time are not "first grade" (or highest quality). The recordation of particular out-of-limit conditions allow the TAG system 10 to group spools experiencing the same conditions to permit consistent analysis and disposition of all spools involved.

The conditions monitored by the controller 24 over the time of plant operation are also provided to a process historian database 170 over a link 172, for a purpose to be described. In practice, all process conditions monitored for the entire period of machine operation are forwarded to the process historian database 170.

Machine level information provided to TAG system 10 from the controller 24 also includes the speed set-point for each wind-up mechanism 16 on the machine 12.

Position level information provided from the controller 24 to the TAG System 10 includes the beginning and ending wind-up times for each spool 20 produced at a position. From this wind-up information (and knowing the tare weight of the core 18) the logic unit 10L is able to calculate a weight for the fiber on the finished spool 20. The ending wind-up time also serves as the basis for assigning a time during a production run at which a given spool 20 was finished. From this ending wind-up time the "age" of the fiber on that spool may be calculated by the logic 10L. The controller 24 would also provide an indication to the TAG System 10 as to the number of the position on which a given spool has been wound. From this information the logic 10L is able to calculate whether the spool is produced at an "even" or an "odd" machine position.

Each finished spool 20, when doffed from the wind-up mechanism 16 on which it is wound, is identified by a unique identifier tag 26. The TAG System 10 uses the unique identifier tag 26 to link together the various pieces of information derived about a given spool 20 as it moves over the production floor from manufacture to warehouse storage.

The identifier tag 26 is applied to the finished spool 20 by the operator. In the usual case the tag 26 is manually applied on the inside surface of the core 18. The tag 20 may be produced locally by the controller 24, which outputs a command over a line 28 to a suitable apparatus, such as a label printer 30. Suitable for use as the label printer is that device manufactured and sold by Intermec as model 3440. Alternatively, the tag 26 may be produced under the control of the TAG System 10 by a signal transmitted to the label printer 30 over a line 34.

Figure 2A:
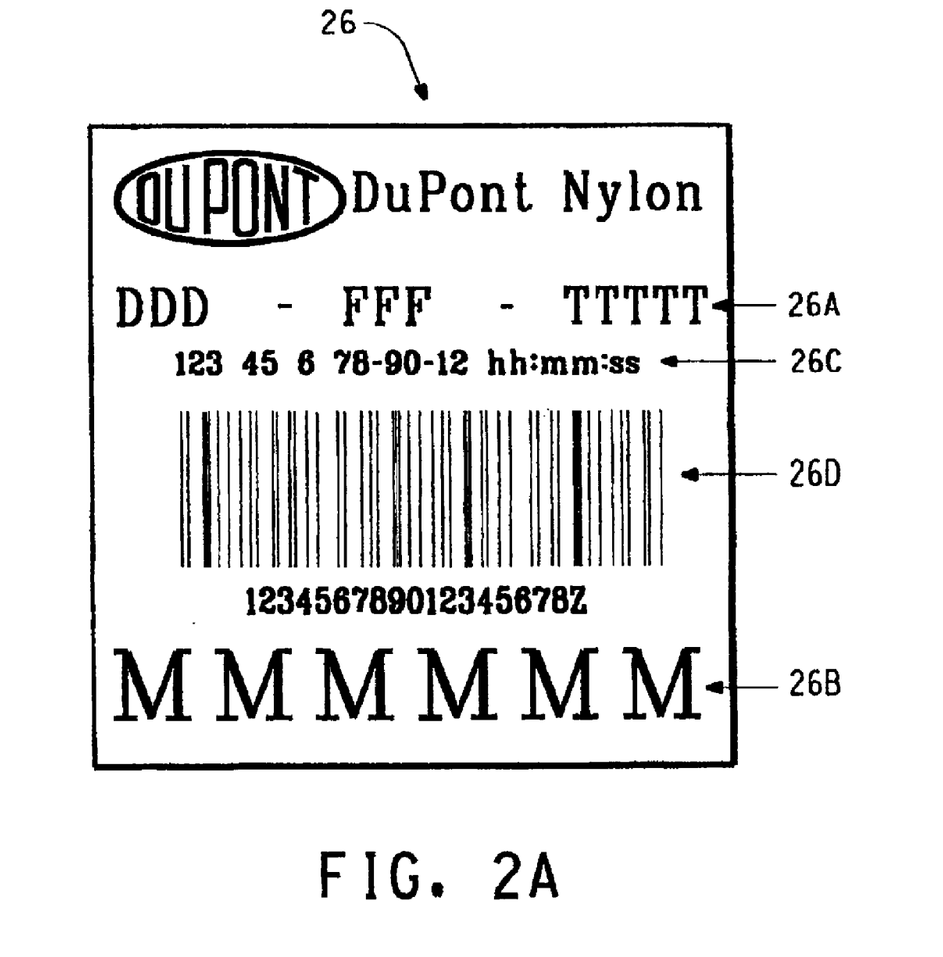

FIG. 2A illustrates a representative example of a typical identifier tag 26. The tag 26 includes various information fields. Field 26A contains information identifying the denier ("DDD"), number of filaments ("FFF") and type ("TTTTT") of the yarn on the spool. Field 26B identifies the Merge ("MMMMMM") of the yarn. Field 26C includes information that identifies the position number producing the yarn (e.g., "6"), and the ending wind-up time ("hh:mm:ss", in hours, minutes and seconds). Field 26D is the barcode-format identifier of the spool. Although the spool identifier is printed on the label 26 using a machine readable bar code, any other suitable identifier indicia may be used.

As a finished spool 20 moves over the manufacturing floor, information is transmitted to and from the TAG System 10 using strategically positioned interface units 34. Although not expressly rendered in the drawing for economy of illustration, each interface unit 34 includes a bar code reader connected to the TAG System. The interface unit 34 also includes a visual display and keyboard or other suitable input/output device, whereby the operator is able to communicate with (i.e., both to and from) the TAG System 10 over the link 36. At each interface unit 34 the identifier tag 26 on the spool 20 is read and information concerning the spool is transmitted to the TAG System 10 or received from TAG system 10 over the display. Any suitable equipment capable of reading the chosen barcode or other symbology on the label 26 and capable of effecting or simulating keyboard entry may be selected for the interface unit 34. Examples of equipment suitable for use are the barcode scanner manufactured and sold by Intermec as model 1552, of that manufactured by Datalogic as model SDD176. The interactions between the TAG System 10 and the operators via the interface units 34 is multi-lingual and can be specified by an operating system setup. When spools 20 are doffed manually the actual weight of each finished spool 20 is ascertained. Each finished spool 20 is manually placed by the operator on a suitable scale 38 located proximally to the spinning machine 12. The results (along with spool identity transmitted via the barcode reader at the proximal interface unit 34) are transmitted to TAG system 10 over a link 40. Any suitable scale may be used. Examples of scales suitable for use is the scale manufactured and sold by Schenck Inc., as model DHF 500, or a scale manufactured by Mettler-Toledo, such as that sold as the "Panther".

Alternatively, some installations where spools are doffed automatically the weight of each spool is calculated by the logic unit 10L. The weight calculation is based upon the meter pump speed, meter pump factor (constant that given unit weight per revolution of pump), known monomer loss constant, and known moisture gain constant denier of the fiber (all available from the spinning recipe) and the time required by the wind-up mechanism 16 to wind the fiber on the particular spool 20 (derived from the controller 24).

In either fashion (i.e., manually and/or automatically) an indication of the actual weight of each finished spool 20 doffed from each position of the machine 12 is entered into the database 10B.

At an inspection station 44 each finished spool 20 is visually inspected by the operator and the results of the inspection (along with the spool identity) are transmitted to TAG System 10 using the proximal interface unit 34. As will be developed the results of the visual inspection are used by TAG System 10 in determining the "grade" of the fiber on the particular spool 20.

Product grade information is also available to TAG System 10 from another source. At various intervals during a production run a physical sample of the fiber produced at each position is taken and forwarded to a laboratory 50 for physical and/or chemical analyses. The results of these physical and/or chemical analyses are transmitted to the TAG system 10 from the lab 50 over the link 52. The information from the lab 50 is used by the logic 10L to determine the "grade" of the fiber on the particular spools produced during the interval covered by the analysis.

It should be noted that since the physical and/or chemical analyses in the lab 50 do not occur in real time, the spools containing fiber covered by the analyses are identified on the basis of the time (Field 26C, FIG. 2A) that a particular spool 20 is wound on the machine 12.

For example, suppose that lab analyses of the fiber produced at a given position on the machine 12 are performed on twelve-hour intervals. The results of the lab analysis for any given interval are entered into the data record corresponding to each spool produced during that interval. The database 10B is able to associate the lab information with the appropriate spools on the basis of the wind-up time at which a spool is produced at the given position. The wind-up time of a particular spool thus serves as an indication that a particular spool has been manufactured during the interval covered by the lab analyses.

Based upon wind-up time of each spool, the lab analyses information for an interval is associated with spools manufactured in that interval. Spools that have been wound during the same interval are believed to carry product that shares the same product quality, or "grade". These spools may be marked in the database 10B with a segregation identifier, termed a "held" or "segregated" spools. This prevent such spools from being packed with product that has a different or no segregation.

The logic 10L is thus provided with various bases which may be used to determine the grade of the fiber on a particular spool. These bases include the product merge (or intended grade), the visual inspection, the reports of conditions as viewed by the controller 24 from which the logic 10L may derive a grade, and the lab analysis. Any discrepancy among those bases selected for use in determining product grade is resolved by the logic 10L applying the lowest grade level to the particular spool.

Wind-up time information is used by the logic 10L to give calculate another information entry, the "age" of the fiber produced (the difference between the fiber wind-up time and real time). Wind-up time information may also be used by the logic 10L to give calculate another information entry relating two spools to each other. The "age span" of fiber on two spools is the time period between the wind-up times for the fiber on each spool.

Summarizing to this point, it should be appreciated that as a result of the various interactions between the manufacturing process and the TAG System 10 the data record in the database 10B for each uniquely identifiable spool includes the following information:

the "kind" of the fiber intended to be produced, including denier and luster ("merge");
the "quality" of the fiber actually produced ("grade");
the machine producing the fiber ("spin machine");
the position producing the fiber ("position", from which a determination as to whether the position is an "odd" or "even" position may be made);
the production run of the producing machine ("Production Run");

the wind-up time during the given production run at which the fiber was wound (from which the "age" and "age span" of the fiber may be determined);

the type of core on which the fiber is wound ("tube type"); and the actual weight of the fiber on the spool.

After visual inspection, finished spools 20 are automatically or manually conveyed from the visual inspection area 44 to a packing station 52. The spools 20 may not be immediately conveyed to the packing station 52, but could be reposed in a holding zone for some predetermined time, in order to afford the fiber time to cure.

At the packing station 52 a plurality of spools are manually or robotically loaded to form a "customer delivery unit". A "customer delivery unit" may alternatively be known as a "bulk pack" or a "package". A "customer delivery unit" for purposes of this application is any formation of spools packed for shipment to a customer. Finished spools may be held in place by a polyethylene wrapping or placed in a carton or container.

The overall goal of the TAG system 10 is to produce a customer delivery unit which collects together spools of fiber that closely match each other in terms of product kind, grade and various other characteristics. Each customer delivery unit is assembled in accordance with predetermined "packing rules", as will be described.

A customer delivery unit may be configured in any one of a variety of configurations ("CDU Config.") using a variety of packing materials. A common configuration is one that includes a top cap and bottom cap, each having single bullet tray thereon. A single bullet tray is a member having an array of projections, termed "bullets", disposed over one surface. Each bullet is sized to correspond to the inside diameter of the core 18 on which the fiber is wound. The bottom cap may be carried on a conveyor, or placed on a pallet, depending upon the conveyance facilities at a given manufacturing facility. Layers of spools are separated by double bullet separators. A double bullet separator is a member having bullets disposed over both its upper and lower surfaces. The number and spacing of the bullets on the trays and/or separators determines the number of spools present in each layer in a package. Empty cores may be used for the purpose of occupying positions in a given layer of a customer delivery unit. When used for this purpose, such an empty core is termed a "spacer". The carton or container for a package may also receive trays and separators.

Each particular configuration of these packing materials used in forming a customer delivery unit is assigned a predetermined CDU configuration ("CDU Config.") The CDU configuration serves as a pointer which identifies for the logic unit 10L the packing materials to be used in forming a given customer delivery unit, as well as providing tare weight information from which the weight of fiber being shipped may be calculated.

As mentioned above, packing rules are the regulations in accordance with which a customer delivery unit is assembled and which govern the degree to which spools having various properties can be packaged together. In addition, packing rules insure that the assembled customer delivery unit is sized consistent with factory, warehouse, and transport handling requirements. The packing rules are stored in the TAG System 10 and may be altered by a user to conform the TAG System 10 to the situation at a given manufacturing site.

Packing rules in accordance with the present invention are designed in such a way that a spool with a given merge, a given grade and a given weight will fall within only a single packing rule. Moreover, each packing rule specifies only one CDU configuration (including the number of layers) and sets forth the total number of spools in a customer delivery. The packing rule may also specify the number of empty cores that may be allowed per layer of the customer delivery unit and whether "odd/even" packing is to be observed.

Figure 3:
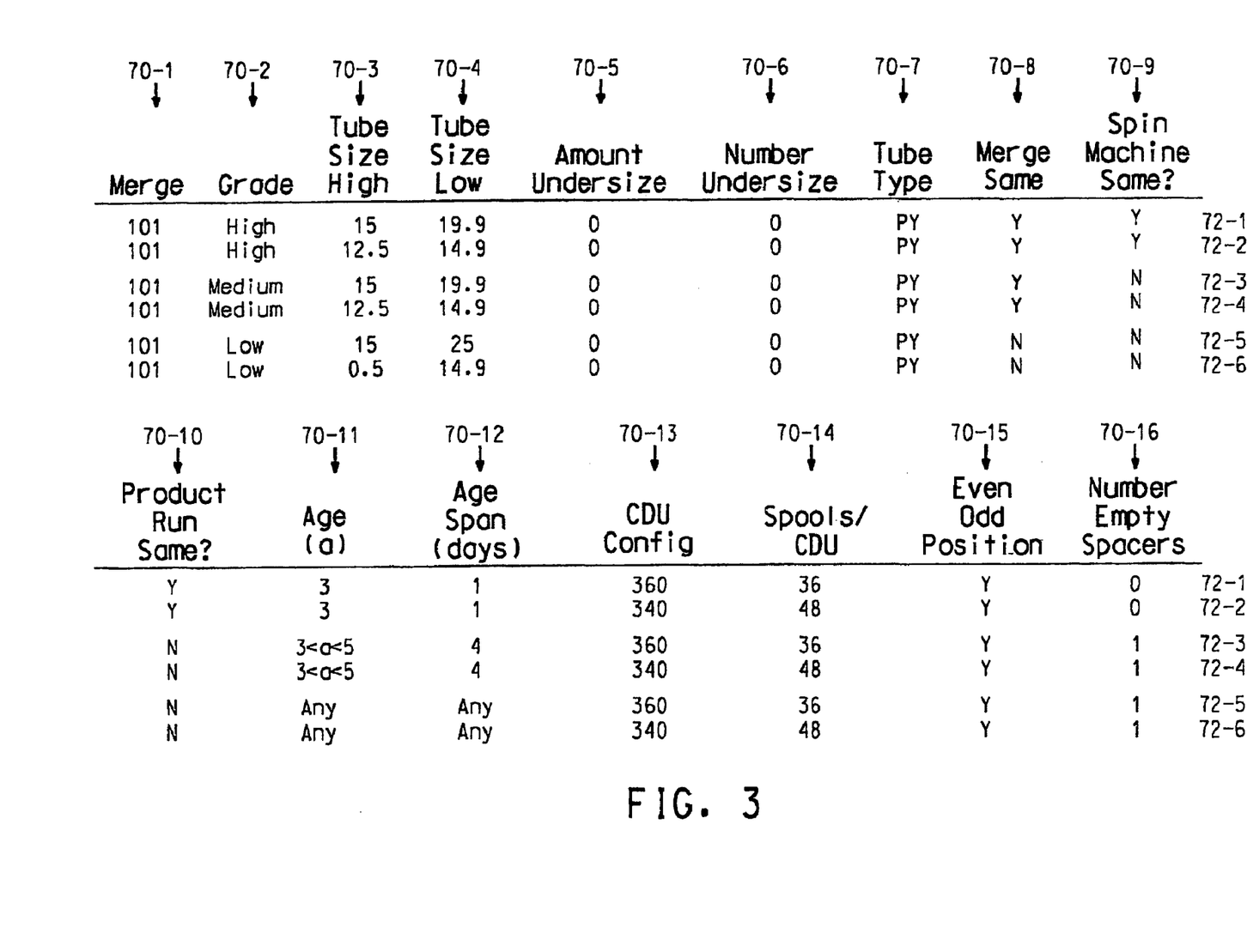
FIG. 3 is a table showing a hypothetical set of packaging rules in accordance with the present invention.

With reference to FIG. 3 shown is a table setting forth a hypothetical set of packing rules in accordance with the present invention.

The vertical columns 70-1 through 70-16 set forth various parameters addressed by the packing rules. The packing rules themselves are the specific collection of parameters defined across each horizontal row 72-1 to 72-6.

Generally speaking, the parameters addressed by the packing rules in accordance with the present invention relate to:

similarity of fiber properties, viz., merge and grade (columns 70-1, 70-2, respectively);

spool weight (columns 70-3 to 70-7);

parameters related to fiber production (columns 70-8 to 70-12); and parameters related customer delivery unit configuration (columns 70-13 to 70-16).

The merge parameter addressed in column 70-1 and the grade parameter addressed in column 70-2 have been earlier discussed.

Columns 70-3 and 70-4 respectively address the upper and lower weight limits of a spool. Column 70-5 sets forth the allowable amount by which a spool may be under the lower weight limit. Note that there is no comparable leeway setting forth the allowable amount by which a spool may be exceed the upper weight limit. Overweight spools are forbidden in the table of rules shown in FIG. 3. Column 70-6 sets forth the number of undersized spools allowed in a package. Column 70-7 identifies the type of core used in the spool.

The fiber production parameters related to similarity of merge (column 70-8), the similarity of spin machine (column 70-9), and the similarity of production run (column 70-10) should be clearly understandable in view of the discussion set forth earlier. The parameter "Age" (column 70-11) specifies the minimum allowable age (e.g., in days) of the fiber on the spool before that spool may be packed. The parameter "Age Span" (column 70-12) specifies the maximum allowable time span (e.g., in days) between the production dates of the "newest" and "oldest" spools in the package.

The configuration parameters are set forth in columns 70-13 to 70-16. The parameter "CDU Config." (column 70-13) contains the code relating to the configuration of the customer delivery unit, as discussed. For example, the code "360" may point to customer delivery unit formed of top and bottom caps and the appropriate number of trays and separators to form six levels of spools. The code "340 " represents a different combination of packing materials, presumably having a different tare weight. The parameter "Spools/CDU" (column 70-15) sets forth the total number of spools per customer delivery unit in accordance with the particular packing rule. The parameter "Number Empty Spacers" (column 70-16) sets forth the number of empty cores permitted in each level of the customer delivery unit.

The parameter "Even Odd Position" addressed in column 70-15 relates to whether the customer delivery unit may contain only fiber produced at an even or an odd production position, calculated as discussed earlier.

Each horizontal row 72-1 to 72-6 defines a single packing rule. In FIG. 3 all rules 72-1 through 72-6 relate to fiber having the same merge, i.e., merge "101". Rules 72-1 and 72-2 are packing rules respectively directed to "High" grade, "101"-merge fiber. Rule 72-1 is directed to heavy spools of the merge/grade fiber (i.e., spools having a weight in the range from 15 to 19.9 pounds). Rule 72-2 is directed to lighter-weight spools of the merge/grade fiber (i.e., spools having a weight in the range from 12.5 to 14.9 pounds).

Rules 72-3 and 72-4 are packing rules respectively directed to "Medium" grade, "101"-merge fiber, while Rules 72-5 and 72-6 are packing rules respectively directed to "Low" grade, "101"-merge fiber. It will be noticed that the first rule in each of the recited rule-pair (e.g., 72-3, 72-4 and 72-5 and 72-6) is directed to heavy spools, while the second rule in the pair is directed to light-weight spools.

It is be seen from FIG. 3 that the particular packing rule to be applied to a given spool is determined in accordance with the merge of product on the spool, the grade of the product on the spool, and the weight of the product carried on a given spool. The packing rules are designed such that one, and only one, packing rule applies to a spool.

Figure 4A:
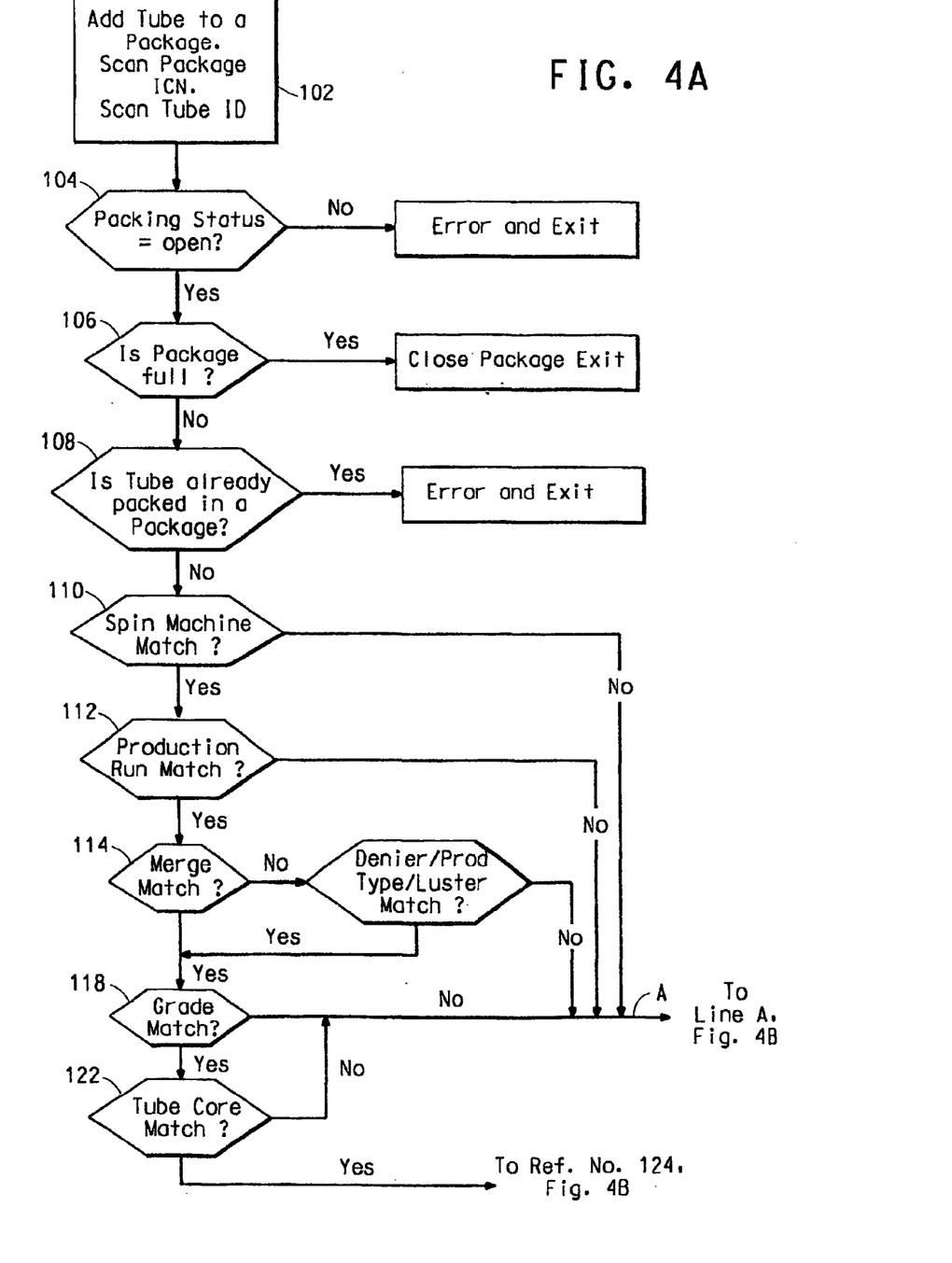
FIG. 4A is a flow diagram of a program using the packing rules of FIG. 3 to govern the assembly of a package in accordance with the process of the present invention.
Figure 4B:
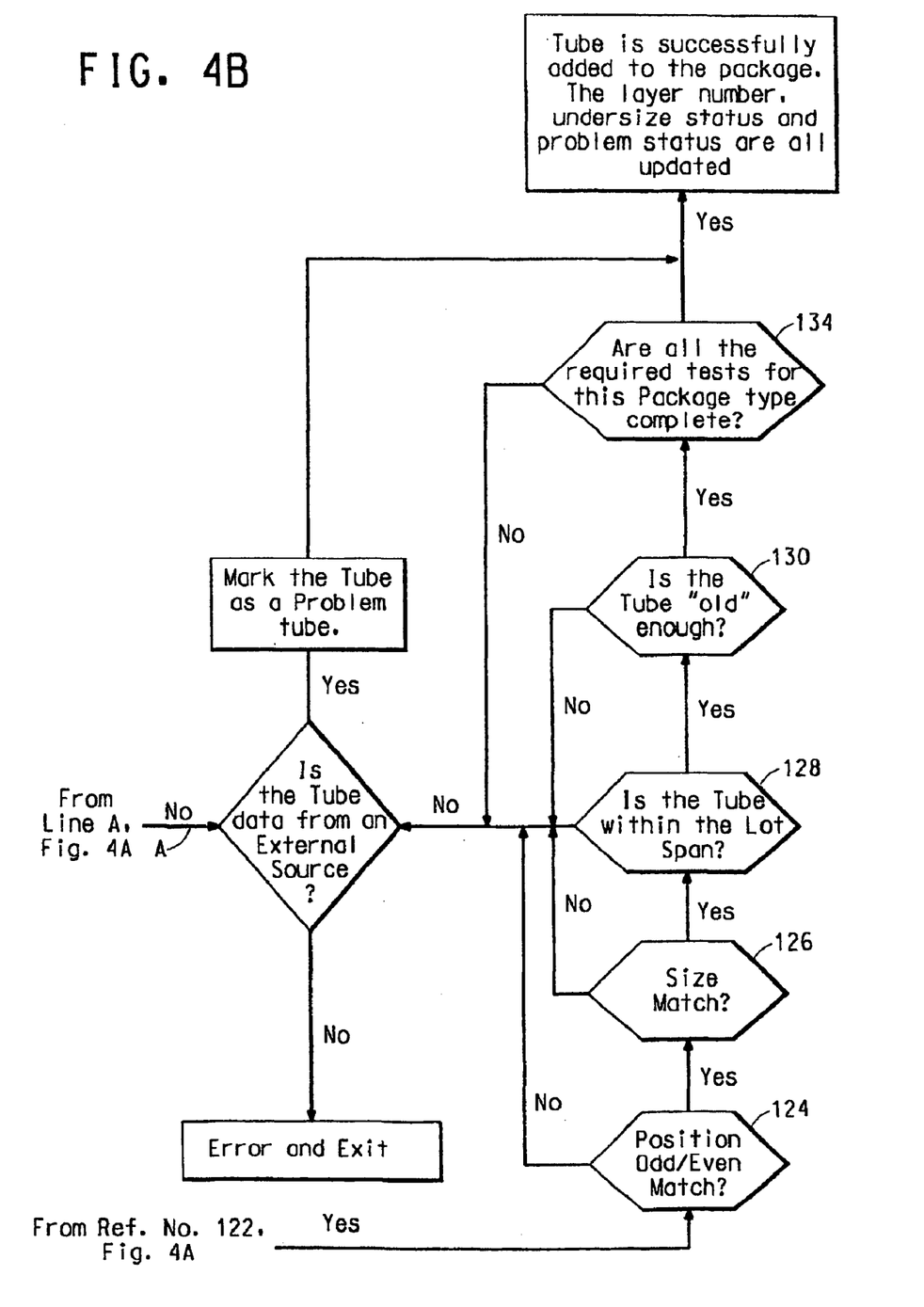
FIG. 4B is a continuation of the flow diagram of a program using the packing rules of FIG. 4A that governs the assembly of a package in accordance with the process of the present invention.

The manner in which the TAG System 10 uses a selected one of the packing rules 72 to govern the assembly of a package at the packing station 52 may now be discussed in view of the program flow diagram of FIG. 4A and FIG. 4B. Spools may be packed manually or robotically.

In practice, the applicable packing rule is determined by the logic unit 10L based upon the kind, grade and weight of the first spool proposed for the customer delivery unit. For example, suppose an operator (or robot) selects a light-weight spool carrying "101"-merge, "Medium" grade fiber. From FIG. 3 it should be apparent that based on the kind, grade and weight of the fiber on that first spool, the logic unit 10L would select packing rule 72-4 to govern the inclusion of the other spools proposed for that customer delivery unit.

With specific reference to FIG. 4A and FIG. 4B shown are comparisons performed by the logic unit 10L in adding a spool to a customer delivery unit. (For clarity of discussion, it should be that the term "tube" is used in the flow diagram of FIG. 4A and FIG. 4B to indicate a shed spool.)

Preliminarily, as indicated at block 102, each customer delivery unit being constructed is itself uniquely identified either by an interim identification number. The operator at the packing station may affix to the customer delivery unit a tag having a unique, bar code readable identifier number printed thereon. The tag number is input to TAG System 10 via the bar code reader at the interface unit 34 positioned adjacent to the packing station 44. Alternatively, a tag with the interim identification number may be provided to the operator from the TAG System 10 via the interface unit 34. In this case, the interface unit 34 would include a label printer.

Once the customer delivery unit is identified by the interim identification number the identity of each spool attempted to be added to the customer delivery unit is identified to TAG System 10 via the bar code reader at the interface unit 34.

As seen at blocks 104, 106, and 108, the logic unit 10L in TAG system 10 verifies that status of the customer delivery unit is "open", verifies that the customer delivery unit is not yet full, and verifies a spool with the same identifier has not already been packaged.

Based upon the configuration code (parameter 70-13) contained within the selected packing rule the logic 10L indicates to the operator via the interface unit 34 the permissible packing components and the number of layers of spools that may be used in forming the customer deliver unit. The total number of spools in the customer delivery unit (parameter 70-14) and the allowable number of spacers (parameter 70-16) is also transmitted to the operator.

Assuming that these precautions are satisfied, for each spool proposed for inclusion in a customer delivery unit, the logic 10L in the TAG System 10 verifies compliance with the parameters mandated by the appropriate packing rule through a series of comparisons. It is noted that the sequence of the comparison is not critical.

The following correspondence Table associates each of the decision blocks indicated in the flow diagram of FIG. 4A and FIG. 4B with the corresponding parameters 70-n (FIG. 3) of the applicable packing rule.

TABLE

| Decision Block | Rule Parameter |
| --- | --- |
| 110 | 70-9 |
| 112 | 70-10 |
| 114 | 70-1, 70-8 |
| 118 | 70-2 |
| 122 | 70-7 |
| 124 | 70-15 |
| 126 | 70-3 to 70-6 |
| 128 | 70-12 |
| 130 | 70-11 |

In block 134, the logic verifies that all of the laboratory analyses on the fiber on the spool in question have been completed.

If a spool proposed for inclusion in a customer delivery unit does not meet a parameter as required by the packing rule, the logic unit 10L notifies the operator that inclusion of that spool in the customer delivery unit is not permitted.

Upon completion of the packing the identifier numbers of all of the spools packed in the customer delivery unit identified by the given interim identification number are contained in the database 10B.

After the package is constructed, it is moved to a weighing station 140. At the weighing station the actual weight of the customer delivery unit is ascertained by a suitable scale. Scales suitable for use at the weighing station include those devices manufactured by Mettler-Toledo and sold as models ID7.

PM300, or Toledo 8142. Information representative of the gross weight of the customer delivery unit is transmitted to TAG System via the link 142.

The logic unit 10L determines actual weight of the fiber in the customer delivery unit by subtracting the tare weights of the packaging components (determined by the packing rule) from the measured gross weight of the customer delivery unit. The logic unit also calculates the "commercial" weight of the customer delivery unit by applying a moisture regain factor for North America sites that follow American Standards Testing Method guidelines.

From the weighing station 140 the package is moved to a wrapping station 150 where the customer delivery unit is wrapped with polyethylene wrapping or sealed, as the case may be.

The package is thereafter moved to a labeling station 156 where suitable label 158 is applied to the customer delivery unit. All of the information imprinted on the label 158 is transmitted from TAG system 10 over the link 36 to the interface unit 34 disposed adjacent the labeling station 156. For this purpose the interface unit 34 at this location includes a label printer.

Figure 2B:
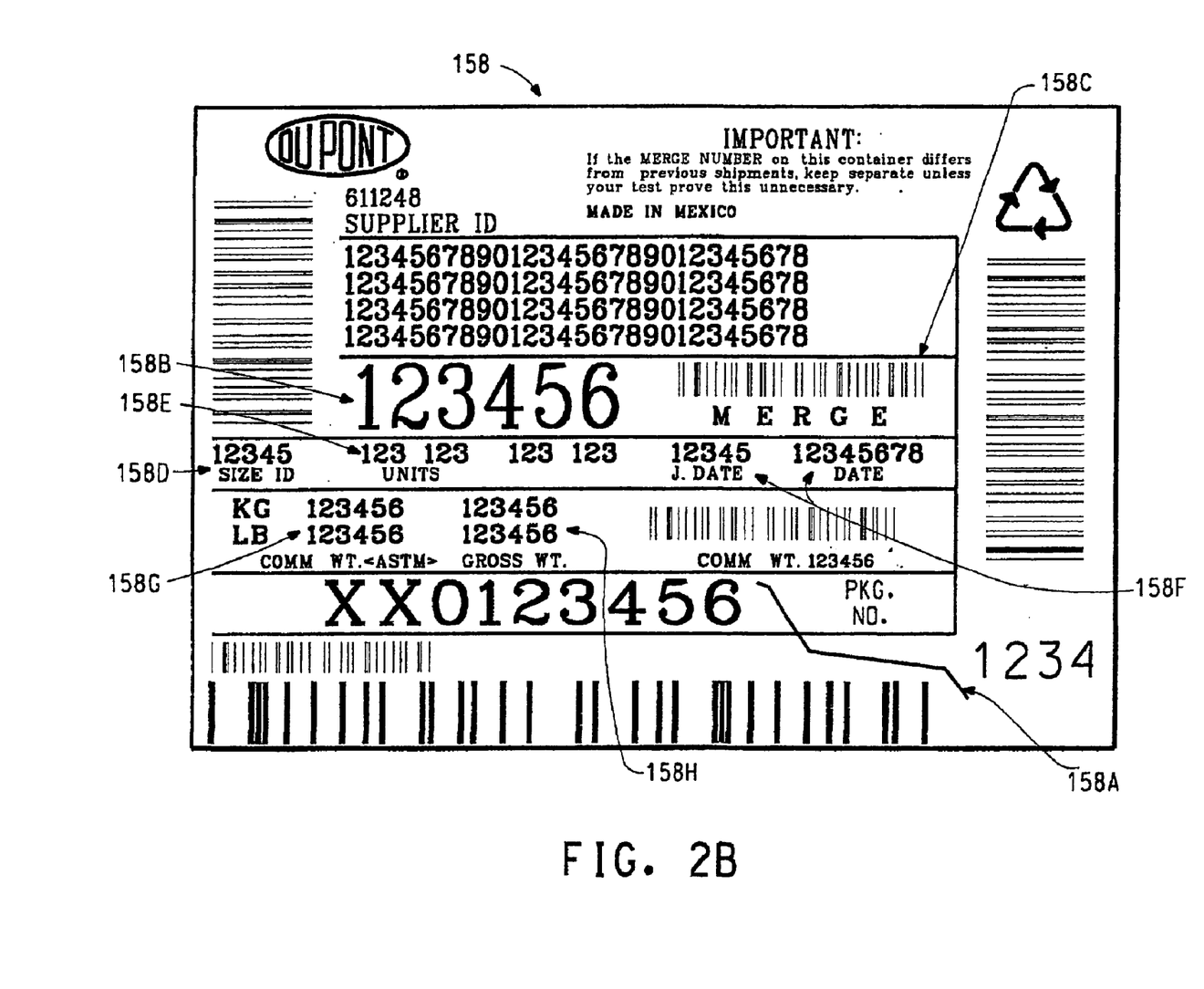
FIG. 2B illustrates a finished product label used to identify a customer delivery unit packaged in accordance with the process of the present invention.

FIG. 2B illustrates a representative example of a typical label 158 for a customer delivery unit. The label 158 includes various information fields. Field 158A shows the final identity number for the customer delivery unit, as assigned by the logic 10L, in both plain text and two barcode readable strips. The merge of the product in the customer delivery unit, in both clear text and in barcode readable format is set forth in fields 158B and 158C, respectively. The size (inside diameter) of the spools in the customer delivery unit, the number of spools and the production date of the oldest spool are indicated in fields 158D, 158E and 158F, respectively. The commercial weight of the fiber and the gross weight of the customer delivery unit are indicated in fields 158G and 158H, respectively.

The customer delivery unit may thereafter go to a warehouse for storage, or to a shipping area for transport to a customer. Information concerning the customer delivery unit and the spools contained therein is transmitted from the TAG System to the Sales and Distribution database 164, over the link 166. This update to Sales and Distribution database 164 places the customer delivery unit along with the attributes required by that system in an environment where it can be selected for shipment to fill a customer order when sold.

Information concerning each customer delivery unit and the spools contained therein is also transmitted from the TAG System to a Product Historian database 180 over the link 182. The Product Historian database 180 thus contains the detailed information discussed herein about the properties of the fiber on each spool of manufactured in the facility.

As noted earlier, the Process Historian database 170 has stored therein predetermined manufacturing process information regarding predetermined process conditions extant during the manufacture of the fiber on each spool. This process information is derived from the controller 24. The process information is recorded and stored on a time-wise basis.

The information in these two databases may be correlated, as indicated by the arrows 184 when correlated. One variable for use in correlating the information in these two databases is the beginning and ending windup times for each spool 20 produced at a position. By correlating the process condition information during the interval that a spool is being wound, provides a powerful insight into correlating fiber properties and fiber process conditions.

It should be readily appreciated by those skilled in the art that the TAG System as herein described provides significant advantages.

By being Table driven, the packing rules may be made configurable to the conditions and equipment available at a given manufacturing facility.

By monitoring each spool produced, the properties of each spool in each customer delivery unit may be controlled in accordance with the packing rules.

The TAGS System of the present invention is implemented in what may be described as use a three-tiered architecture that keeps data separate from application is also seen as advantageous. The first tier includes the user's workstations and contains programs that understand the way in which users input data and the way in which information is displayed to them. The second tier resides on the NT-based server and implements all business logic, including the packing rules. The third tier also resides on an NT-based server and supplies a data storage repository via the SQL Server. The three-tier implementation is believed to minimize support costs and increase the longevity of the fiber.

However, perhaps the most significant advantage is ability to correlate the process and product information in the process and product historian databases 170, 180 respectively. The ability to correlate the process and product information is believed to enable deeper and richer learnings around the relationship between the nylon manufacturing process and the conditions thereof with the properties of the resulting fiber.

Those skilled in the art, having the benefit of the teachings of the present invention, as hereinabove set forth, may effect numerous modifications thereto. It should be understood that all such modifications lie within the contemplation of the present invention as defined by the appended claims.

What is claimed is:

1. A method for packing a customer delivery unit containing a predetermined plurality of spools, each spool having a filamentary product thereon, comprising:
uniquely identifying each of a plurality of spools;
recording for each spool information regarding a kind of product on the spool, a grade of the product on the spool, and a weight information of the product on the spool;
based on the kind, grade, and weight information of the product, assigning to each spool an appropriate one of plurality of packing rules;
selecting a predetermined plurality of tubes for inclusion in a customer delivery unit in accordance with the packing rule assigned to each selected spool;
visually inspecting the filamentary product on a given spool to determine a first grade of the filamentary product on the spool;
for each spool, recording the time at which the filamentary product on that spool is produced by the machine;
sampling the filamentary product produced by the machine during a predetermined sample interval;
analyzing the sampled filamentary product to determine a second grade of the filamentary product on the spool;
comparing the first grade of the filamentary product determined by visual inspection with the second grade of the filamentary product as determined by the analysis
recording for each spool produced during the determined sample interval the lower of the first and second grades of the filamentary product.

2. A method for packing a customer delivery unit containing a predetermined plurality of spools, each spool having a filamentary product thereon, comprising
uniquely identifying each of a plurality of spools;
recording for each spool information regarding a kind of product on the spool, a grade or the product on the spool, and a weight of the product on the spool;
based on the kind, grade, and weight information of the product, assigning to each spool an appropriate one of plurality of packing rules;
selecting a predetermined plurality of tubes for inclusion in a customer delivery unit in accordance with the packing rule assigned to each selected spool;
visually inspecting the filamentary product on a given spool to determine a first grade of the filamentary product on the spool;
for each spool, recording the time at which the filamentary product on that spool is produced by the machine;
sampling the filamentary product produced by the machine during a predetermined sample interval;

analyzing the sampled filamentary product to determine a second grade of the filamentary product on the spool;

monitoring information regarding predetermined process conditions in existence during the manufacture of the filamentary product;

based upon the monitored process condition information, determining a third grade of the filamentary product on the spool, comparing the first, second and third grades of the filamentary product as respectively determined by visual inspection, by the analysis, and by the monitored information; and recording for each spool produced during the predetermined sample interval the lowest of the first, second and third grades of the filamentary product.

* * * * *